INVENTOR.
William S. Eubank
BY Harry Langsam
HIS ATTORNEY.

Oct. 29, 1935. W. S. EUBANK 2,019,296
REFRIGERATING APPARATUS
Filed Sept. 26, 1931 2 Sheets-Sheet 2

INVENTOR.
William S. Eubank
BY Harry Sangsam
HIS ATTORNEY.

Patented Oct. 29, 1935

2,019,296

UNITED STATES PATENT OFFICE 2,019,296

REFRIGERATING APPARATUS

William S. Eubank, Philadelphia, Pa.

Application September 26, 1931, Serial No. 565,262

9 Claims. (Cl. 62—91.5)

My invention relates to a refrigerator and relates more particularly to refrigerators adapted for the home or small establishments; for preservation of foods and for the cooling of air in various methods or processes of air conditioning.

Heretofore, refrigerators for small stores and for the home have made use of the heat absorbing properties of melting ice, electrically driven mechanical refrigerating devices, or the water-cooled absorption process to obtain the desired reduction of temperature within the refrigerators.

The ordinary type of refrigerator using ice as a refrigerant, requires replenishment of the ice, at frequent, even daily, intervals of time. In addition, provision must be made to remove the water left by the melting ice and to clean the ice container. The delivery of the ice is usually accompanied by water dripping to the floor from the melted ice. The mechanical and absorption operated refrigerators are costly both initially and with respect to their operating cost, unpleasantly heat the room in which they are installed, and in addition, the mechanical refrigerators are noisy and the absorption type must be continuously supplied with a source of cooling water as well as a source of heat, ordinarily a gas flame.

My refrigerator employs a refrigerant which may be purchased at convenient stores and carried home or may be manufactured in the home. I, therefore, combine the advantages of the ice refrigerator and the mechanical and absorption refrigerators without their respective disadvantages. I accomplish this by using as a refrigerant solidified carbon dioxide which is harmless and odorless, and evaporates completely without leaving any residues. This substance will produce a refrigerating effect several times greater than that produced by ordinary ice of equal weight.

By using a solidified form of carbon dioxide within a refrigerating cabinet I am able to maintain the necessary low temperature for preserving food stuffs for a period from three to eight days or longer without replenishment of the supply.

Another object of my invention is to produce a device wherein cubes of ice may readily be formed by the refrigerant while keeping the remainder of the cabinet at the desired low temperature.

With the above and other objects in view my invention embodies a refrigerating cabinet containing a cooling unit using solid carbon dioxide as a refrigerant and circulating a solution preferably of brine about water or food containers wherein the water or food is frozen into ice or food cubes, and also to make use of the heat absorbing and heat insulating properties of the cold gaseous carbon dioxide.

A further object is to produce a device wherein foods may be frozen.

Other objects of my invention are to provide an improved device of the character described, that is easily and economically produced, sturdy in construction and having a maximum efficiency.

With the above and related objects in view my invention consists in the details of construction and combination of parts as will be more fully understood from the following detailed description in conjunction with the accompanying drawings in which.

Figure 1:
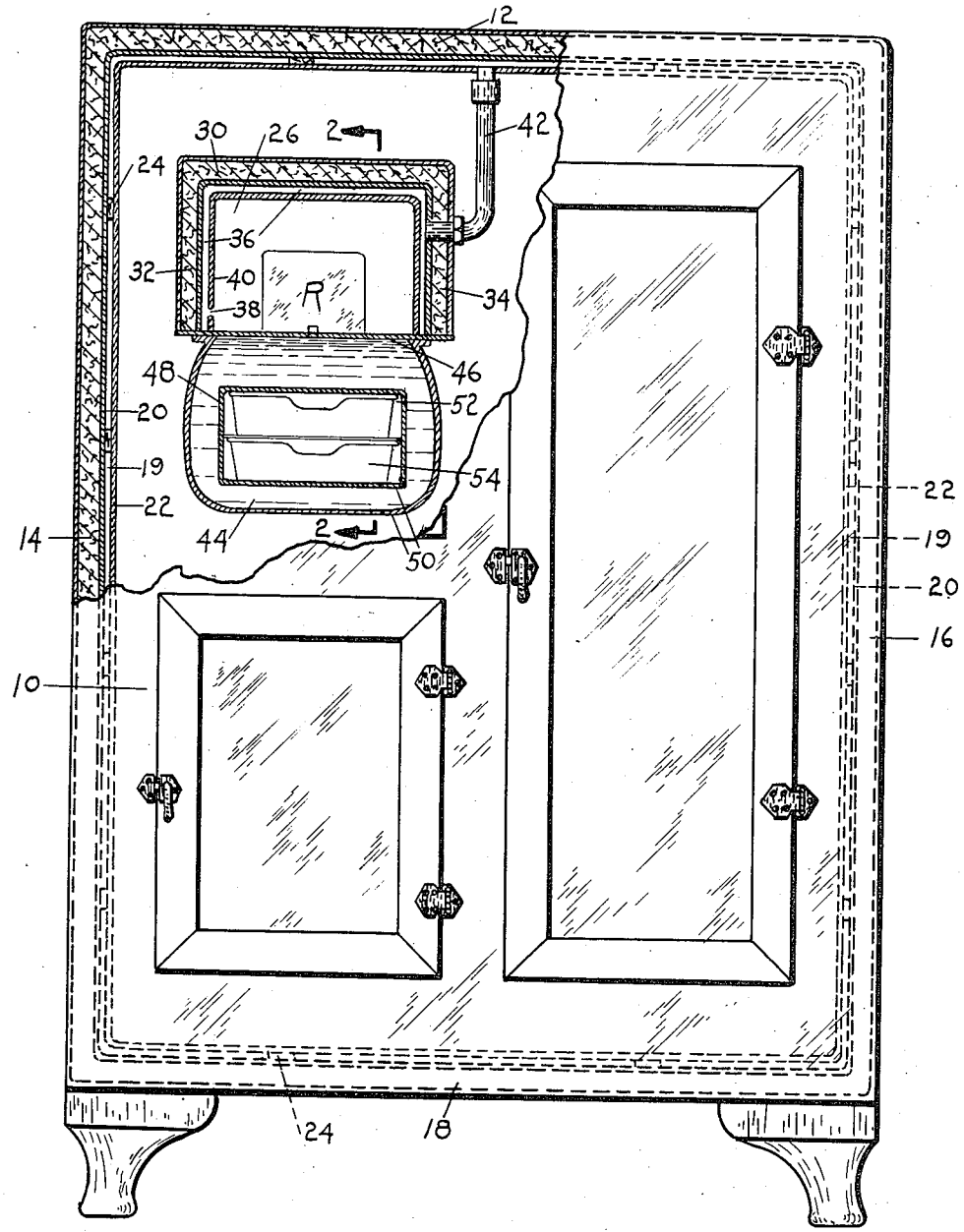
Fig. 1 is a front elevational fragmentary view of a refrigerator embodying my invention.
Figure 2:
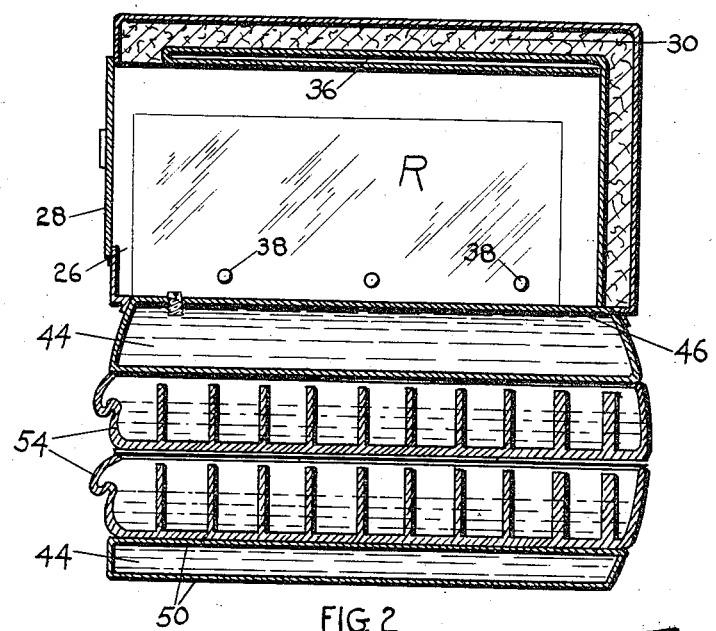
Fig. 2 is a sectional view taken on the line 2—2 of Fig. 1.

Referring more specifically to the drawings, I show a refrigerator cabinet 10, of the type used in the home, subdivided interiorly to afford a plurality of chambers. The outer shell of the refrigerator 10 includes a suitable thermal insulation on its top 12, its side walls 14 and 16, and its bottom 18, as well as at the back wall and the front wall. This insulation may be of ground cork, solid cork of one or more layers, mineral wool, asbestos or other heat insulating material. A hollow space or pocket 19 is formed between the inner metal shells 20 and 22 of the cabinet 10, the innermost shell 22 forming the lining of the cabinet. Spacers 24 of a heat insulating material are secured at intervals to maintain the spacing between the shells 20 and 22, and to provide the required mechanical strength.

Inside the cabinet and located at the top and to one side is a rectangular receptacle 26 in which a refrigerant R of solid carbon dioxide, more or less dense as desired and either in brick form or other shape is placed. The refrigerant is introduced through a door in the cabinet and a front metal door 28 of the receptacle.

The receptacle 26 is suitably supported within the interior of the cabinet and is constructed of a thermal insulating material on the top 30, side walls 32 and 34 and the back. An interior hollow metal jacket 36 surrounds the inside of the side walls 32 and 34 and the top 30. The interior of the jacket is in communication with the interior of the receptacle 26 through a series of openings or apertures, 38, in one of the jacket walls 40. A communicating tube 42 joins the interior of the jacket 36 with the hollow space 19 of the cabinet 10.

Beneath the receptacle 26 is a hollow metal cooling unit 44, having the metal bottom 46 of the receptacle as its top, with separate side and front walls 48 and bottom 50, and with an internal chamber 52. The internal chamber 52 is open toward the front of the cabinet and has suitable supports for the water freezing trays 54 wherein the cubes of ice or food are formed. The cooling unit 44 is filled with a solution of brine so that the entire cooling unit is chilled by convection after contact with the cold surface 46. The brine solution used has the property of remaining in the liquid or mushy state when used under these conditions and is preferably composed of a twenty-five per cent solution of calcium chloride but any other percentage or suitable freezing solution such as magnesium chloride may be utilized.

An overflow pipe (not shown) leading to the unit 44 may be placed to one side of that unit, to accommodate a surplus of brine solution or other liquids such as an alcohol solution that will not freeze, or other solutions which will freeze solid, or a gas.

My invention operates as follows:

The free cold gas sublimated from the solid carbon dioxide within the receptacle 26 passes through the apertures 38 into the jacket 36 surrounding the interior of the receptacle and is forced by the pressure of the expanding gas through the communicating tube 42 into the space 19, in the inner walls of the cabinet 10. The free carbon dioxide gas then passes into the hollow space 19 at the top, sides and bottom of the cabinet 10 and finds its way out of the refrigerator either by leakage thru the back end of the space 19 where there is no metal, or through other suitable means at the bottom of the cabinet 10. The gas moving downwardly in the space 19 is still very cold and continues to remove heat from the interior of the cabinet until it is finally exhausted into the atmosphere of the room. In this manner the full cooling properties of the refrigerant are efficiently utilized. Coincidently with the above-described process, the refrigerant cools the top wall 46 of the cooling unit 44 on which it rests, by conduction and convection in the receptacle 26. The brine or non-solid substance in the cooling unit is chilled by contact with the top wall 46 and circulates by convection to cool the entire cooling unit 44. The temperature of the substance in the unit 44 is below 32° F. and quickly freezes the water or food in the trays within the chamber 52. The air in the cabinet 10 is cooled by conduction from the cooling unit and by convection of the air throughout the cabinet. By appropriate selection of dimensions and materials the temperature within the refrigerator may be reduced and maintained within the desired temperature limits.

Inasmuch as my refrigerator may be operated in a location where proper ventilation is not feasible, a rigid or flexible tube or other similar means may be employed to lead the expanded carbon dioxide gas out of the room or building in which the refrigerator is housed. This would eliminate vitiation of the air in the room by mixture with the carbon dioxide, which, in ordinarily ventilated rooms flows to the floor and leaks out of the rooms under the doors with negligible effect on the air.

Figure 4:
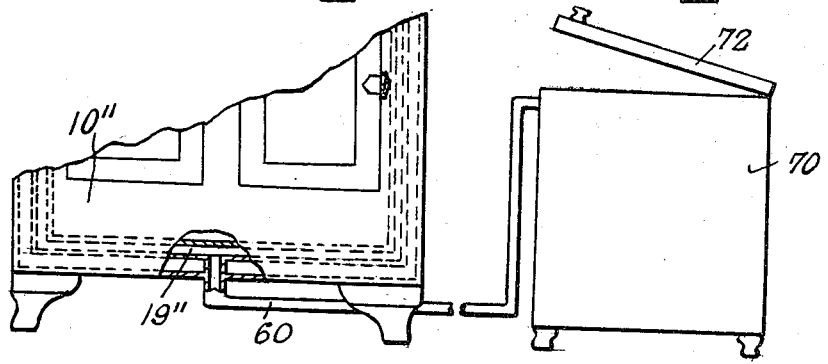
Fig. 4 is a fragmentary front elevational view, partly in section, of another modification of my refrigerator in which the spent carbon dioxide is led into a food reservoir located at a distant point.

Fig. 4 illustrates the method by which the expanded gases are led away from the refrigerator. The space 19' of the cabinet 10' opens into a pipe 60, at the bottom of the cabinet. After circulating through the space 19', the carbon dioxide is forced into the pipe 60 by the pressure of the expanding gas and is conveyed to a remote point for purposes of further use or disposal.

Figure 3:
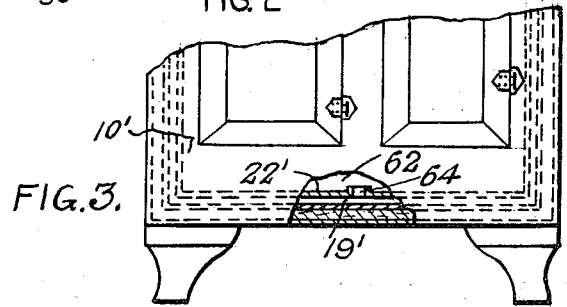
Fig. 3 is a fragmentary front elevational view, partly in section, of a modification of my refrigerator in which the spent carbon dioxide is directed into the food compartment.

A modification of my refrigerator, shown in Fig. 3, provides for an optional means to permit the escaping carbon dioxide gas to be passed into the inner food containing compartments and replace the air therein, which is lighter and can be vented at the top. The hollow space 19' of the cabinet 10' communicates with the food compartment 64 by means of an opening 64 in the bottom part of the inner shell 22' forming the lining of the cabinet. The purpose of this construction is to permit the carbon dioxide gas to surround the food within the refrigerator, and further prevent decay by replacing the air with the chemically inert carbon dioxide. Further, the outer front doors of the refrigerator can be arranged to open above a given level in the inner compartment, leaving a section of the refrigerator at the bottom from which the carbon dioxide will not pour out when the door is opened, due to its relatively greater heaviness than air. In this section edibles which are particularly preserved by the carbon dioxide may be kept. Since this latter principle of preservation for some edibles is independent of temperature, this compartment need not be part of the refrigerator but may be some distance away. Fig. 4 shows a modification of my invention in which the expanded gases, after being conveyed away from the cabinet 10', are led into a separate food container 70. This container is provided with a cover 72 which is not a close fit, so that the gas may easily escape from the container between the cover and its seat. On the other hand it may be combined with the refrigerator to save space and make use of a roll-top heat-insulating cover or other cover, if desired.

In localities where solid carbon dioxide may be difficult to procure, a cartridge or "cold bullet" which is another form of refrigerant, may be used to replace the solid carbon dioxide. The cartridge, which consists of calcium chloride is frozen below 0° F., at a place remote from that in which it is to be used and is placed in the receptacle instead of the solid carbon dioxide refrigerant. It is to be noted that this cartridge may also be utilized in the ordinary ice refrigerator in place of the ice refrigerant.

Upon the complete sublimation of the solid carbon dioxide and, also, the complete dissipation of the carbon dioxide gas, there still remains the cold or nearly frozen brine, that functions as the equivalent of another refrigerant, and, which may of itself keep the interior of the refrigerator at the proper temperature for a period of approximately twenty-four hours.

Although the invention has been described in considerable detail, such description is intended as illustrative rather than limiting, as the invention may be variously embodied, and the scope of the invention is to be determined as claimed.

I claim:

1. In a refrigerating cabinet having a thermo-insulation covering, a receptacle for solid carbon dioxide having a thermo-insulation covering on its top and side, a heat conductor on its bottom, a jacket of metal containing a brine solution in contact with said heat conductor bottom, and a metal tray being adapted to retain water surrounded by said jacket wherein cubes of ice may be formed.

2. In a refrigerating cabinet having a thermal-insulated covering, a receptacle for solid carbon dioxide within said cabinet, said receptacle having a thermal-insulated covering on its top sides and back, and an inner jacket adapted to conduct gaseous carbon dioxide on its sides and top, and said inner jacket in communication with an interspaced wall surrounding the cabinet whereby gas therein may absorb heat from the interior of the cabinet.

3. In a refrigerating cabinet having a thermal insulated casing, a receptacle for solid carbon dioxide within the cabinet, a brine solution adapted to be in contact with the receptacle, means guiding the sublimated gas about said cabinet and said receptacle to augment the heat exchange and means for guiding the spent carbon dioxide to a distant point.

4. In a refrigerating cabinet having a thermal-insulated casing, a receptacle for solid carbon dioxide within the cabinet, a brine solution container in contact with the receptacle, means guiding the sublimated gas about said cabinet and said receptacle to augment the heat exchange and means guiding the spent carbon dioxide to a distant point where it deposits into a food reservoir for food preservation purposes.

5. In a refrigerating cabinet having a thermal-insulated casing, a receptacle for solid carbon dioxide within the cabinet, a brine solution container in contact with the receptacle, means guiding the sublimated gas about said cabinet and said receptacle to augment the heat exchange, and means for permitting the spent carbon dioxide to enter the food compartments for preserving the edibles contained therein.

6. In a refrigerating cabinet having a thermal-insulated casing, an externally thermally insulated receptacle having a portion of the external surface non-insulated and being adapted to hold a solid frozen cartridge of calcium chloride, a brine solution container in contact with the non-insulated portion of said receptacle, and a plurality of trays adapted to hold water, whereby said water is to be frozen by the brine solution.

7. In a refrigerating cabinet having a thermal insulated casing, a receptacle for solid carbon dioxide within the cabinet, said receptacle having its exposed outer portions thermally insulated to conserve the consumption of the refrigerant and also having an unexposed and non-insulated portion, a brine solution container in contact with the unexposed and non-insulated portion of said receptacle, a plurality of trays adapted to retain water, whereby said water may be frozen by the brine solution, and means guiding the sublimated gas about said receptacle and said cabinet so that the heat exchange may be further augmented.

8. In a refrigerating cabinet having a thermo-insulating covering, a receptacle including thermo-insulation surfaces and a heat conducting surface, said receptacle adapted to retain solidified carbon dioxide, a jacket adapted to retain a liquid solution in contact with said heat conducting surface, and a tray adapted to retain water wherein ice may be formed, the jacket being interposed between said tray and said heat conducting surface.

9. In a refrigerating unit comprising a thermo-insulating covering, a receptacle including thermo-insulation surfaces and a heat conducting surface, said receptacle adapted to retain a cooling medium, a reservoir adapted to retain a liquid solution in contact with said heat conducting surface, and means to retain water which is to be cooled, said reservoir being interposed between said tray and said heat conducting surface.

WILLIAM S. EUBANK.